United States Patent
Raad et al.

[19]

[11] Patent Number: 6,064,810

[45] Date of Patent: May 16, 2000

[54] SYSTEM AND METHOD FOR PREDICTING THE BEHAVIOR OF A COMPONENT

[75] Inventors: Peter E. Raad, Dallas; James S. Wilson, Hurst; Donald C. Price, Dallas, all of Tex.

[73] Assignees: Southern Methodist University; Texas Instruments Incorporated, both of Dallas, Tex.

[21] Appl. No.: 08/723,198

[22] Filed: Sep. 27, 1996

[51] Int. Cl.$^7$ .................................................. G06F 17/50
[52] U.S. Cl. ........................... 395/500.43; 395/500.21; 395/500.23
[58] Field of Search ................... 395/500.43, 500.23, 395/500.21, 500.01, 500.44; 702/85; 712/20, 23

[56] References Cited

U.S. PATENT DOCUMENTS

| | | | |
|---|---|---|---|
| 5,646,868 | 7/1997 | Ueda et al. ................................ | 702/85 |
| 5,692,160 | 11/1997 | Sarin ..................................... | 395/500.44 |
| 5,699,284 | 12/1997 | Muramatsu ............................. | 395/500.01 |
| 5,813,798 | 9/1998 | Whiffen ................................... | 405/52 |
| 5,828,894 | 10/1998 | Wilkinson et al. ..................... | 712/20 |
| 5,842,031 | 11/1998 | Barker et al. .......................... | 712/23 |

OTHER PUBLICATIONS

Wilson, J. and Decker, K., (1994), "GaAs MMIC Thermal Modeling for Channel Temperatures in Accelerated Life Test Fixtures and Microwave Modules," IEEE Semitherm 10 proceedings, 1994.

Wright, J., Marks, B., Decker, K. (1991), "Modeling of MMIC for Determining MMIC Channel Temparatures During Life Tests," IEEE Semitherm 7 proceedings, 1991.

Ibrahim, M., Paradis, L., and Paterson, D. (1991), "Finite Element Modeling of a MMIC Transmitter Module for Thermal/Structural Design Automation," IEEE Semitherm 7 proceedings, 1991.

Webb, P. (1993), "Thermal Modeling of Power Gallium Arsenide Microwave Integrated Circuits," IEEE Transactions on Electron Devices, vol. 40, May 1993, pp. 867–877.

Caruso, S.C., Ferziger, J.H. and Oliger, J. (1985), "Adaptive Grid Techniques for Elliptic–Fluid Problems," Report TF–23 Thermosciences Division, Department of Mechanical Engineering, Stanford University.

Berger, Marsh J. (1982), "Adaptive Mesh Refinement for Hyperbolic Partial Differential Equations," PhD Dissertation, Department of Computer Science, Stanford University.

van der Wijngaart, Robertus Franciscus (1989), "Composite–Grid Techniques and Adaptive Mesh Refinement in Computational Fluid Dynamics," PhD Dissertation, Stanford University.

Perng, Chin–Yuan (1990), "Adaptive–Multigrid Computations for Incompressible Flows, Including Geometry, Temperature, and Salinity Effects," PhD Dissertation, Stanford University.

Zang, Yan (1993), "On the Development of Tools for the Simulation of Geophysical Flows," PhD Dissertation, Stanford University.

Wilson, J. (1994), "PhD Dissertation Proposal: Transient Temperature Prediction in Extremely Small Semiconductor Junctions," Southern Methodist University.

(List continued on next page.)

*Primary Examiner*—Kevin J. Teska
*Assistant Examiner*—Russell W. Frejd
*Attorney, Agent, or Firm*—Baker Botts L.L.P.

[57] ABSTRACT

A system (2) predicts the behavior of a component using refinements in both space and time. The system (2) includes a steady-state engine (14) that generates a steady-state stencil (16) that defines successively refined meshes (58, 60, 90, 118, 122) in space. A transient engine (18) adopts the spatial framework of the steady-state stencil (16) to predict the behavior of the component over time. The transient engine (18) may adjust a time interval (356) to refine the predictions in time.

33 Claims, 8 Drawing Sheets

OTHER PUBLICATIONS

J. Wang et al., "Finite Element Analysis of MMIC Structures and Electronic Packages Using Absorbing Boundary Conditions", IEEE Transactions on Microwave Theory and Techniques, vol. 42, No. 3, Mar. 1994, pp. 441–449.

P. Mezzanotte et al., "Analysis of Packaged Microwave Integrated Circuits by FDTD", IEEE Transactions on Microwave Theory and Techniques, vol. 42, No. 9, Sep. 1994, pp. 1796–1801.

P. Raad et al., "Adaptive Modeling of the Transients of Submicron Integrated Circuits", IEEE Transactions on Components, Packaging, and Manufacturing Technology—Part A, vol. 21, No. 3, Sep. 1998, pp. 412–417.

SYSTEM AND METHOD FOR PREDICTING THE BEHAVIOR OF A COMPONENT

TECHNICAL FIELD OF THE INVENTION

This invention relates in general to the field of predictive modeling, and more particularly to a system and method for predicting the behavior of a component.

BACKGROUND OF THE INVENTION

Many designers of electronics, fluid dynamics, and other systems wish to predict the behavior of components of these systems to guide design. It is often desirable for designers to predict the behavior of such components subject to conditions associated with materials used to construct the components and environments in which the components operate. For example, a designer of integrated circuits might predict the thermal behavior of a gallium arsenide (GaAs) transistor having submicron geometric features under particular operating and environmental conditions to assess electrical performance, reliability, failure modes, and design feasibility.

As designs for electronics, fluid dynamics, and other systems become increasingly complex and evolve to include components with geometric and temporal features that span numerous orders of magnitude, designers may predict the behavior of these components using various techniques. A known technique for predicting the behavior of a component requires extensive computational resources to numerically solve partial differential equations for a characteristic, such as temperature, for enough points in space and time to adequately resolve the often minute geometric and temporal features. Although limited efforts have been made to relieve the tremendous computational burden associated with such techniques, these efforts have been insufficient. Furthermore, while previous efforts may have attempted to more efficiently address the geometric complexities of the problem, such efforts fail to account for the significant transient behavior that many components experience, for example, in monolithic microwave integrated circuits (MMIC) or other integrated circuits having pulsed mode operation.

Moreover, in addition to ignoring temporal behavior, which is itself a critical deficiency, such techniques are often limited to unrealistically restrictive materials, operating conditions, and environmental factors, neglect surface features and properties that vary in some manner with the characteristic under consideration, and fail to comprehend the reliability penalty that is often associated with wide fluctuations of the characteristic. For example, deleterious effects related to temperature in integrated circuits are exacerbated as geometric features become more dense and operating frequencies increase to meet particular requirements. Since higher operating temperatures can have a significant and negative effect on the electrical performance and reliability of many integrated circuits, accurately and efficiently predicting transient thermal response is crucial to effective circuit design. Current techniques, which do not provide this capability, are therefore inadequate for predicting component behavior in the rapidly evolving telecommunications and electronics fields.

SUMMARY OF THE INVENTION

In accordance with the present invention, the disadvantages and problems associated with systems and methods for predicting the behavior of a component have been substantially reduced or eliminated.

In accordance with one embodiment of the present invention, a system for predicting the behavior of a component includes a steady-state engine that generates first values representing the behavior of the component, in accordance with boundary conditions associated with the component, at first nodes defined by a coarse mesh. The steady-state engine generates second values representing the behavior of the component at second nodes defined by a first refined mesh that coincides with the coarse mesh at common nodes. The steady-state engine defines a first subdomain in response to a comparison of the first and second values for the common nodes.

In a more particular embodiment, the system predicts the thermal behavior of the component. The steady-state engine solves partial differential equations to generate first and second values representing thermal predictions for corresponding nodes. In another more particular embodiment, the system predicts the fluid dynamic behavior of the component. The steady-state engine solves partial differential equations to generate first and second values representing fluid velocity predictions for corresponding nodes.

In a further more particular embodiment, the system also includes a transient engine that generates a first prediction for each node of the coarse mesh at a first time that ends a time interval and a second prediction for each node of the coarse mesh at a plurality of subintervals ending at the first time. The transient engine compares the first prediction and the second prediction generated for a node of the coarse mesh at the first time and adjusts the time interval according to the comparison.

Important technical advantages of the present invention include providing a system and method for predicting the behavior of a component that uses a finite volume or structured grid approach to predict transient thermal, fluid dynamical, and other behavior within components having geometric and temporal features spanning numerous orders of magnitude. The present invention allows designers, for example, a designer of a high density, high power pulsed mode MMIC component with submicron geometric features and rapid associated temperature fluctuations, to predict electrical performance, reliability, failure modes, and design feasibility to resolve potential design problems relatively early in the design cycle.

The present invention uses successive spatial and temporal refinement to decrease computational burdens and design cycle time. This technique also increases the accuracy of performance and reliability estimates to ensure improved quality through better design. Furthermore, the finite volume or structured grid approach of the present invention can predict the behavior of a component that operates in virtually any environment or system for which a characteristic associated with the component behaves in accordance with known partial differential equations in space and/or time.

BRIEF DESCRIPTION OF THE DRAWINGS

For a complete understanding of the present invention and for further features and advantages thereof, reference is now made to the following description taken in conjunction with the accompanying drawings, in which.

DETAILED DESCRIPTION OF THE INVENTION

Figure 1:
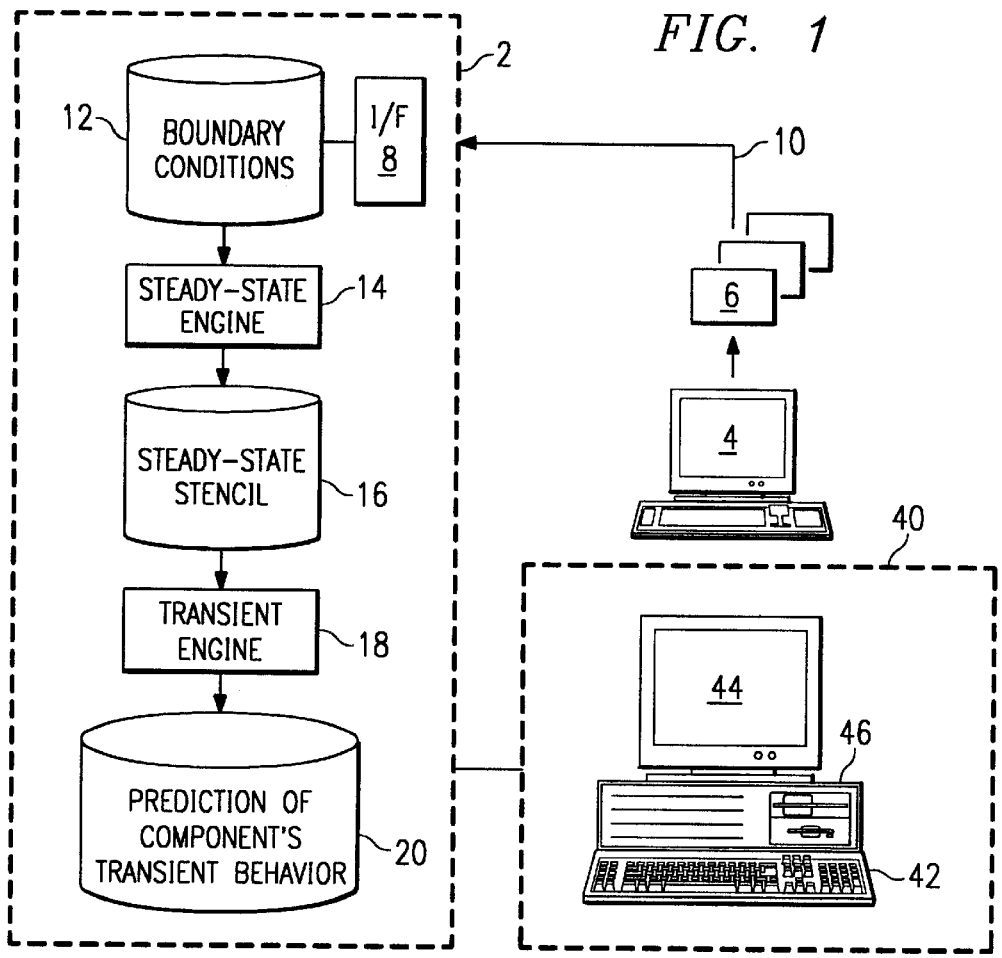
FIG. 1 illustrates an exemplary system for predicting the behavior of a component according to the teachings of the present invention.

FIG. 1 illustrates a system 2 for predicting the behavior of a component. The component may be any device, structure, mechanism, material, composition, compound, or other aggregation of matter; may be any point, region, or volume within a larger aggregation of matter; may be a solid, liquid, or gas; or may be any combination of the above. System 2 may predict the thermal, electrical, fluid dynamical, thermodynamical, or any other physical behavior that is associated with or varies in accordance with one or more elliptical, parabolic, hyperbolic, or "stiff" partial differential equations.

For example, system 2 may predict the transient thermal behavior of a component that includes some or all of a monolithic microwave integrated circuit (MMIC) or other integrated circuit with submicron geometric features and constructed using gallium arsenide (GaAs), silicon, or other semiconductive material. Alternatively, system 2 may predict the behavior of a fluid flowing through a pipe, blood vessel, air duct, or other fluid dynamical system. For any selected component and characteristic, system 2 predicts the component's behavior with respect to the characteristic, such as temperature, subject to one or more boundary conditions 6. Although the present invention is described primarily with reference to predicting thermal behavior, and in particular the thermal behavior of a MMIC component, this discussion applies equally to other suitable components and characteristics.

Boundary conditions 6 may include, for example, and not by way of limitation: thermal characteristics of the component, such as thermal conductivity and specific heat; geometric characteristics of the component, such as the magnitude, location, and temporal behavior of heat sources, heat sinks, surface features, internal voids, and other characteristics that affect or influence the component's behavior; characteristics of the environment surrounding the component, such as insulation, temperature and pressure conditions, and other conditions; one or more defined constants or other characteristics associated with the component, such as density, chemical formula, electrical conductivity, atomic number, or other constant; temporal considerations affecting the operation of system 2, such as a start time, end time, quasi-steady-state requirement, or other consideration; a specified or variable accuracy parameter, error threshold, or other criterion; and any other boundary condition suitable for predicting the component's behavior using system 2.

Boundary conditions 6 may be variable or constant over some or all of the time period for which the component's behavior is predicted; may depend linearly or non-linearly on temperature, pressure, velocity, acceleration, charge, or other factor; or may have other defined or measurable characteristics. Boundary conditions 6 may be global, applying to the entire component or its perimeter, or local, applying to one or more subdomains within the component or the perimeters of these subdomains. In one embodiment, local boundary conditions 6 for a particular subdomain are specified according to previous values calculated for points or regions that define the subdomain. Boundary conditions 6 may include an interest definition to instruct system 2 to ignore or otherwise avoid further refinement with respect to one or more regions of the component, for example, a subdomain that includes a heat source for which refined analysis is not desired. In one embodiment, Boundary conditions 6 may be difficult to determine precisely, but have a significant effect on the accuracy with which system 2 predicts the component's behavior.

Collectively, boundary conditions 6 and the associated equations that govern or predict the behavior of the component in response to boundary conditions 6 define a numeric problem or model of the component. For example, boundary conditions 6 and associated heat transfer equations may define a thermal model of a MMIC device. Designer 4 may generate boundary conditions 6 and associated numeric relationships for a variety of problems or models to be processed by system 2.

System 2 receives one or more boundary conditions 6 from designer 4 and stores boundary conditions 6 in database 12. System 2 may also receive associated numeric relationships, such as program code to solve heat transfer equations, or may store these relationships internally. Designer 4 may be autonomous or operated by one or more persons associated with system 2. Designer 4 may be any logical entity in hardware and/or software, such as a mainframe, miniframe, or personal computer, that communicates information with system 2. Designer 4 may communicate boundary conditions 6 to system 2, separately or together, using interface 8 and any suitable wireline or wireless link 10. Database 12 may include one or more databases, files, or other data repositories at a single or multiple locations local to or remote from system 2.

Steady-state engine 14 is coupled to and interacts with database 12 to access boundary conditions 6. Using one or more boundary conditions 6, steady-state engine 14 generates a steady-state stencil 16 that serves as a geometric foundation, framework, or construct to predict the component's transient thermal behavior, which may vary significantly over a specified time period. In one embodiment, system 2 uses a dynamically adaptive refinement technique in both time and space to predict the component's thermal behavior using steady-state stencil 16. Steady-state engine 14 may store steady-state stencil 16 in one or more databases, files, or other data repositories at one or more locations local to or remote from system 2. Steady-state engine 14 may generate a single or multiple steady-state stencils 16, depending on boundary conditions 6 and modifications to boundary conditions 6 that occur during the operation of system 2. The manner in which steady-state engine 14 generates steady-state stencil 16 is discussed more fully below with reference to FIG. 8.

Transient engine 18 receives or otherwise accesses steady-state stencil 16 to generate a prediction 20 concerning the component's transient thermal behavior over a time period of interest. Transient engine 18 may store prediction 20 in one or more databases, files, or other data repositories at one or more locations local to or remote from system 2.

Transient engine 18 may generate reports that summarize, convey, or otherwise provide prediction 20 and other information to designer 4 or other persons or devices. The manner in which transient engine 18 generates prediction 20 is discussed more fully below with reference to FIG. 10.

System 2 may operate on one or more computers 40 at one or more locations that are integral to or separate from the hardware and software that supports boundary conditions 6. Computer 40 may include an input device 42 such as a keypad, touch screen, microphone, or other device that can accept information. An output device 44 may convey information associated with the operation of system 2, including digital or analog data, visual information, or audio information. Both input device 42 and output device 44 may include fixed or removable storage media, such as magnetic computer disks, CD-ROM or other suitable media to both receive output from and provide input to system 2. Computer 40 may have one or more processors 46 and associated volatile or non-volatile memory to execute instructions and manipulate information in accordance with the operation of steady state engine 14 and transient engine 18 within system 2. For example, computer 40 may store and execute instructions, such as heat transfer equations and numerical integration techniques, to generate predictions using boundary conditions 6.

According to the teachings of the present invention, the component is represented, for example, using a finite volume or structured grid approach. A series of successively refined meshes in space define multiple areas or volumes within the component that interact with each other according to known physical or numerical equations, relationships, or techniques. For example, temperature prediction uses known heat transfer equations, fluid dynamics prediction uses known fluid dynamic relationships, and prediction corresponding to other characteristics uses known equations associated with those characteristics. The present invention frames or constructs the problem and solves the appropriate equations repeatedly over time to predict the behavior of the component with respect to a characteristic, for example, temperature, in both space and time.

Since many components present geometric and temporal features that span numerous orders of magnitude, accuracy demands that the problem be solved at a resolution fine enough to adequately capture the transient behavior of the smallest of these spatial and temporal features. For example, a MMIC device may experience nearly instantaneous temperature fluctuations in localized areas due to pulsed operation, while temperature characteristics over most of the circuit remain gradual and well-behaved. As a result, predicting the behavior of the component using known techniques imposes a tremendous computational burden that limits the effectiveness of such techniques. Using a successive refinement technique in space and time, system 2 eliminates much of the computational burden that would otherwise be required to predict the component's behavior to a specified accuracy at areas and times of greatest interest. The present invention breaks up the problem in space and time while dynamically and adaptively balancing the competing factors of accuracy and computational demand to generate prediction 20 of the component's transient behavior.

Figure 2C:
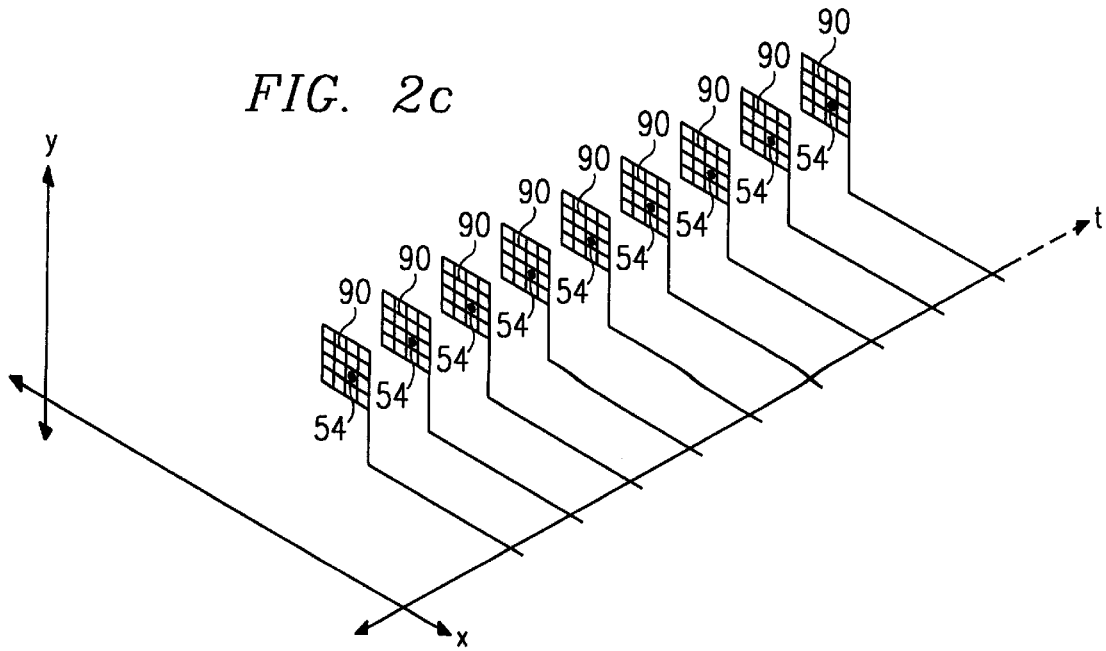
FIGS. 2a through 2c illustrate a coarse mesh, a first refined mesh, and a second refined mesh at various times within a time period.
Figure 2A:
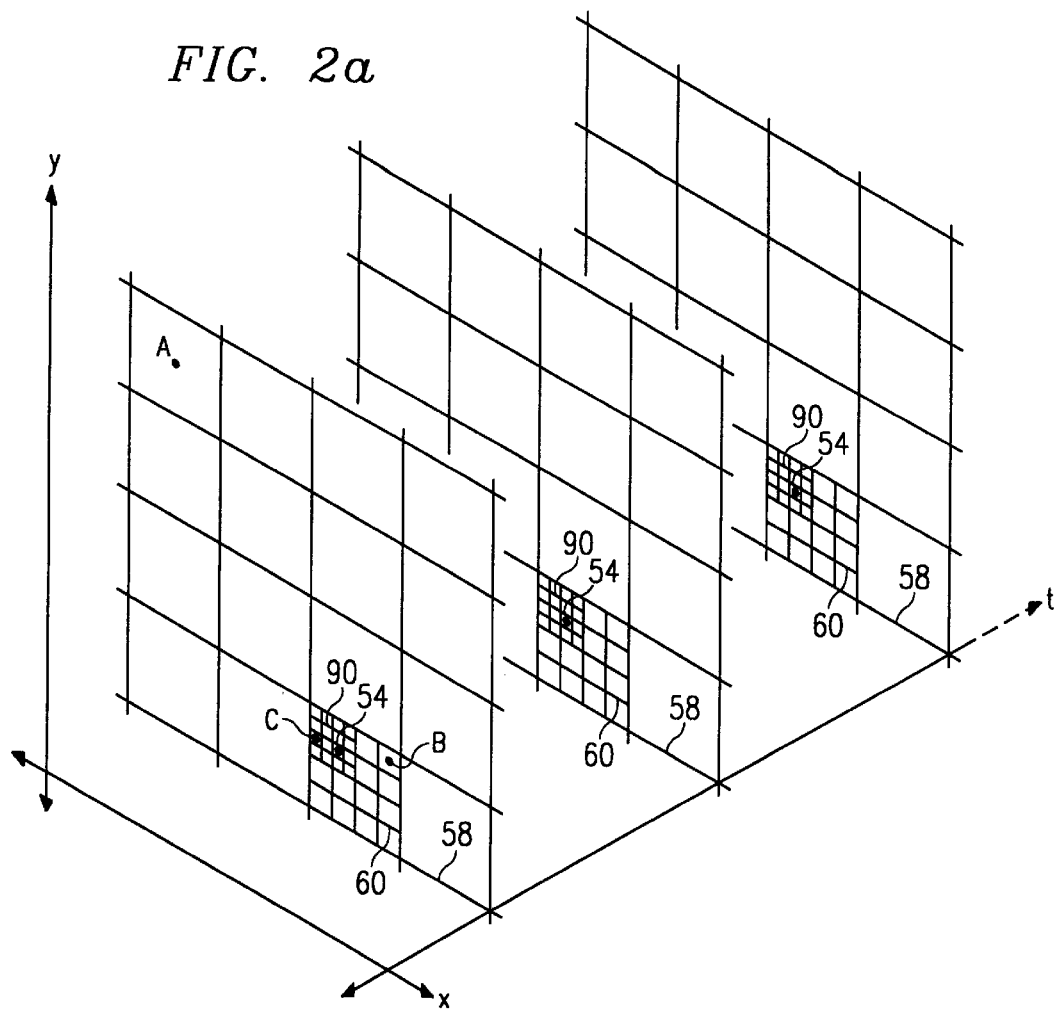
Figure 2B:
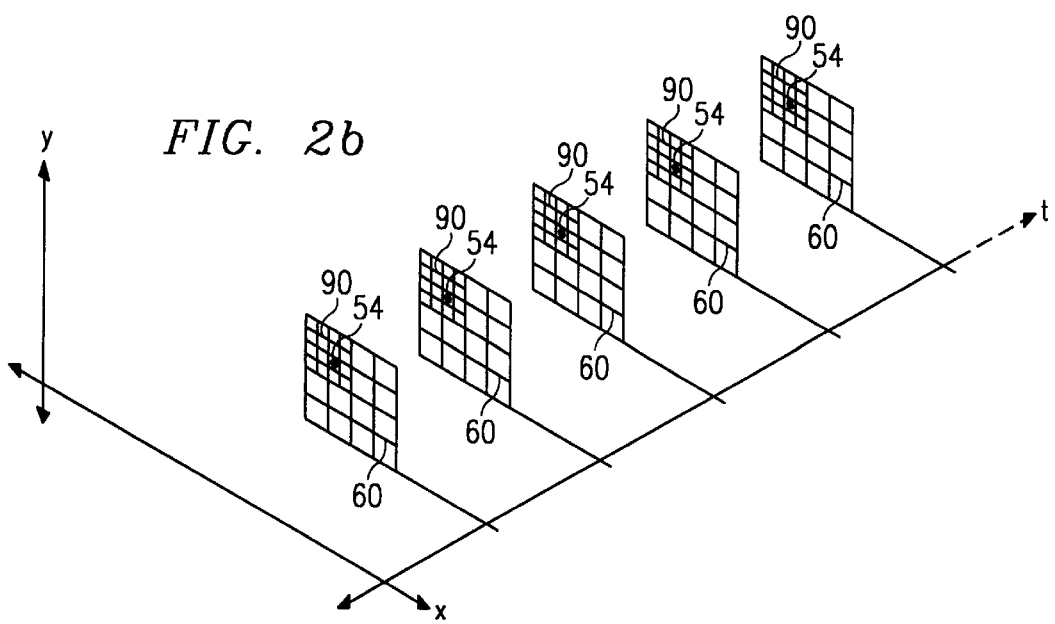

FIGS. 2a through 2c illustrate a coarse mesh 58, a first refined mesh 60, and a second refined mesh 90 at various times within a specified time interval. Coarse mesh 58, first refined mesh 60, and second refined mesh 90 each span regions of the component in two or three dimensions that include source 54, which may be any feature or other condition that influences the component's behavior with respect to a characteristic, for example, temperature, within at least a portion of the component. For example, source 54 may be a region underlying a gate or any other heat source that influences the thermal behavior of a MMIC in two or three dimensions. Source 54 may also be a sink or other feature having a negative strength. System 2 uses these and other successively refined meshes to generate steady-state stencil 16, which system 2 uses to predict the component's behavior over successively smaller areas or volumes within the component surrounding source 54. In one embodiment, successive refinement in mesh density allows system 2 to generate increasingly accurate predictions according to the extent of spatial refinement.

In one embodiment, system 2 performs further spatial refinement of any particular mesh only for regions within the component for which the predictions generated using previous meshes do not achieve a specified accuracy or error threshold. The predictions for the remaining portion of the component are considered acceptable without further spatial refinement. In this manner, system 2 generates a steady-state stencil 16 that is a two or three dimensional patchwork of nested meshes over the entire area or volume of the component that define regions for which successive spatial refinement is desirable for generating predictions to within a desired accuracy, while dramatically reducing computational burdens.

As FIGS. 2a through 2c illustrate, system 2 successively refines predictions in both time and space to provide increased computational efficiency in generating an accurate prediction of the component's transient behavior over a specified time period. For example, for coarse mesh 58, system 2 may predict the component's behavior within the specified time period at intervals on the order of one second. For first refined mesh 60 and second refined mesh 90, system 2 may predict the component's behavior within the selected period at intervals on the order of one hundredth of a second and one ten-thousandth of a second, respectively. Although the degree and manner in which system 2 successively refines the solution in space and time may vary according to the circumstances, system 2 predicts the component's transient behavior to a desired accuracy using fewer computational resources. In one embodiment, time intervals for each successive mesh are dynamically and adaptively determined, possibly based on a specified initial interval, as system 2 marches through time to predict the component's behavior over the entire time horizon of interest.

For example, points A, B, and C in FIG. 2a may represent any points within the component. System 2 matches computational precision with physical behavior, such as the magnitude of temperature gradients at points A, B, and C. In one embodiment, since point A is farther from source 54 than point B, thermal gradients near point A are less intense than thermal gradients near point B. System 2 provides less spatial and temporal refinement to predict the transient thermal behavior near point A than point B. Similarly, since point B is farther from source 54 than point C, thermal gradients near point B are less intense than thermal gradients near point C. System 2 provides less spatial and temporal refinement to adequately resolve the transient thermal behavior of the component at point B than point C. In this manner, system 2 predicts the behavior of the component to a specified accuracy while minimizing computational burdens.

Figure 3:
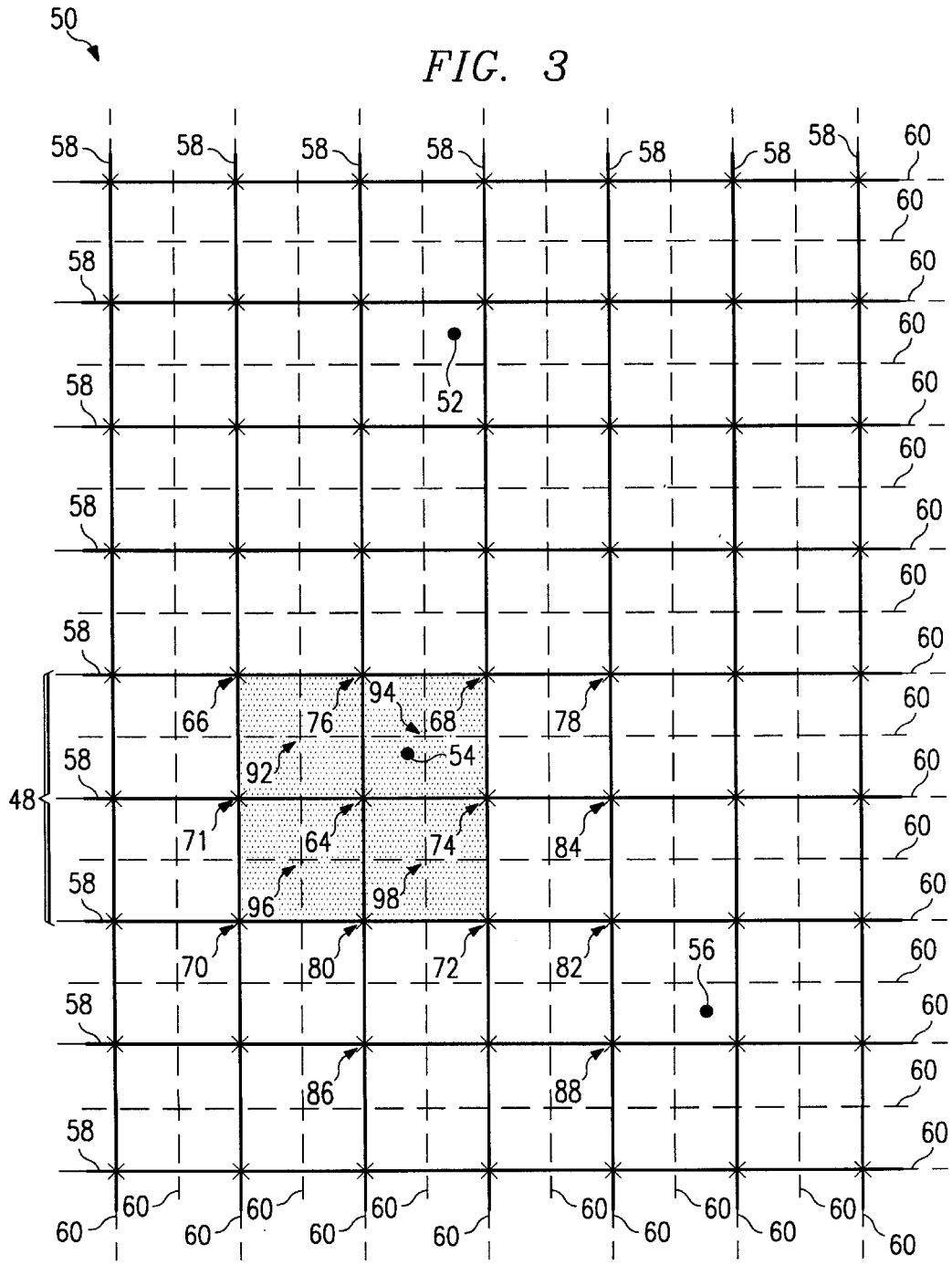
FIG. 3 illustrates a coarse mesh and a first refined mesh over a domain of a component.

FIG. 3 illustrates coarse mesh 58 and first refined mesh 60 over a selected domain 50 of the component that includes sources 52, 54, and 56. Domain 50 may include the entire component or a selected area, volume, or other portion of the component in two or three dimensions for which boundary conditions 6 may be specified. The present invention provides adaptive mesh refinement in three dimensions, where appropriate, to predict the behavior of components having significant thermal or other gradients in two or three dimensions. Sources 52, 54, and 56 may be heat sources, heat sinks, or other features that influence the component's temperature behavior, fluid sources, fluid sinks, or other features influencing the component's fluid dynamical behavior, or any other source that influences the behavior of at least a portion of the component. If the component is a monolithic microwave integrated circuit or other integrated circuit, then sources 52, 54, and 56 may each be heat sources that represent a submicron heat generating region associated with a particular gate in a particular channel of the component. Although sources 52, 54, and 56 are discussed, domain 50 may include more or fewer sources, depending on boundary conditions 6 and the selection of domain 50.

Coarse mesh 58 shown in solid lines defines multiple areas, volumes, or other regions, in two or three dimensions, within domain 50. Although the regions are shown as square or cubical, coarse mesh 58 may define regions of any shape and in any symmetrical or asymmetrical pattern. In one embodiment, for increased computational efficiency, coarse mesh 58 defines square or cubical regions that each have the same area or volume and are each adjacent an identical region. The lines or planes that form coarse mesh 58 intersect at nodes that are each indicated by an "X" in FIG. 3. Using the governing equations and boundary conditions 6, system 2 integrates or determines a value for a characteristic of the component's behavior, for example, temperature, over a subdomain that surrounds each node of coarse mesh 58, in two or three dimensions, to generate a prediction of the component's behavior at the particular node. A predicted temperature at a node represents the calculated value of temperature for an area immediately surrounding and associated with the node. The prediction for each node of coarse mesh 58 may vary as a function of time. A temperature prediction at all nodes provides a profile or patchwork of areas and associated values to represent the component's thermal behavior.

For example, for a two dimensional domain 50 using coarse mesh 58, system 2 integrates one or more partial differential equations according to boundary conditions 6 over the subdomain defined by nodes 66, 68, 70, and 72 to generate a temperature prediction for node 64, possibly using predicted values for nodes 66, 68, 70, and 72 in the calculation; integrates according to boundary conditions 6 over the subdomain defined by nodes 76, 78, 80, and 82 to generate a temperature prediction for node 74, possibly using predicted values for nodes 76, 78, 80, and 82 in the calculation; and integrates in accordance with boundary conditions 6 over the subdomain defined by nodes 64, 84, 86, and 88 to generate a temperature prediction for node 72, possibly using predicted values for nodes 64, 84, 86, and 88 in the calculation. The present invention contemplates any suitable technique for generating a prediction according to numeric relationships and boundary conditions 6 for the characteristic for each node of coarse mesh 58.

Like coarse mesh 58, first refined mesh 60 shown in dashed lines defines multiple areas, volumes, or other regions, in two or three dimensions, within domain 50. In one embodiment, first refined mesh 60 defines regions having the same shape as the regions defined by coarse mesh 58, but having one fourth the area or one sixteenth the volume. That is, the intersecting lines or planes that form coarse mesh 58 are twice as far apart as the lines or planes that form first refined mesh 60. The present invention contemplates any other suitable relationships between coarse mesh 58 and first refined mesh 60, depending on boundary conditions 6, domain 50, the desired accuracy of system 2, available computational resources, and other factors. In one embodiment, as shown in FIG. 3, alternate lines or planes that form first refined mesh 60 overlap or coincide with the lines or planes that form coarse mesh 58 over domain 50. As a result, each node of coarse mesh 58 is a node common to first refined mesh 60. Each common node is indicated by an "X" in FIG. 3.

In a manner similar to that described above in connection with coarse mesh 58, system 2 uses conventional techniques and boundary conditions 6 to integrate or otherwise determine a value for a characteristic of the component's behavior, for example, temperature, over a subdomain that surrounds each node of first refined mesh 60, in two or three dimensions, to generate a prediction of the component's behavior for the particular node. As for coarse mesh 58, the prediction associated with each node of first refined mesh 60 may vary as a function of time.

For example, for a two dimensional domain 50 using first refined mesh 60, system 2 integrates one or more partial differential equations according to boundary conditions 6 over the subdomain defined by nodes 92, 94, 96, and 98 to generate a temperature prediction for node 64, possibly using predicted values for nodes 92, 94, 96, and 98 in the calculation; integrates according to boundary conditions 6 over the subdomain defined by nodes 76, 68, 64, and 74 to generate a temperature prediction for node 94, possibly using predicted values for nodes 76, 68, 64, and 74 in the calculation; and integrates according to boundary conditions 6 over the subdomain defined by nodes 64, 74, 80, and 72 to generate a temperature prediction for node 98, possibly using predicted values for nodes 64, 74, 80, and 72 in the calculation. The present invention contemplates any suitable technique for generating a prediction according to numeric relationships and boundary conditions 6 for the characteristic for each node of first refined mesh 60.

For each common node of coarse mesh 58 and first refined mesh 60 shown as an "X", such as node 64, the prediction generated using first refined mesh 60 is more accurate than the prediction generated using coarse mesh 58. System 2 calculates a difference for each common node between the prediction generated using coarse mesh 58 and the prediction generated using first refined mesh 60. This difference may be an arithmetic difference or any other appropriate metric or measure of a variance between the successive predictions. The larger the difference between the predictions, the greater the need for refinement. In one embodiment, larger differences may correspond to the proximity to source 52, 54, or 56 where larger thermal gradients exist. For example, the difference for node 64 may be larger than for nodes 68, 76, and 74, which are farther from source 54 than node 64, and the differences for nodes 68, 76, and 74 may each be larger than for nodes 66, 70, and 72 which are farther from source 54 than nodes 68, 76, and 74.

System 2 uses the difference between the predictions generated using coarse mesh 58 and first refined mesh 60 to locate subdomains within domain 50, if any, for which further spatial refinement is desirable for accurately predicting the component's behavior. If the difference for a particular common node, for example, node 66, falls below a predetermined threshold, system 2 deems the prediction generated using coarse mesh 58 adequate and performs no further spatial refinement for at least a portion of the associated subdomain used to generate the prediction. If the difference for a particular common node, for example, node 64, exceeds the threshold, system 2 generates a second refined mesh over an associated subdomain 48, represented as the shaded area in FIG. 3. In one embodiment, system 2 defines subdomain 48 as the area defined, for example, by a rectangle or rectangular volume, that includes all common nodes having a difference exceeding the threshold.

The threshold with which the differences between predictions are compared may be specified by designer 4, system 2, or in any other suitable manner. The magnitude of the threshold specified determines the desired accuracy, and therefore the amount of spatial and temporal refinement necessary, since a high threshold will be satisfied by even a relatively large difference between predictions. In one embodiment, system 2 begins operating from any level in space or time to achieve a higher accuracy solution. Designer 4 may therefore begin with a high threshold to rapidly develop a prototype design or feasibility study and then lower the threshold, tightening accuracy requirements, for a final design and performance testing.

Figure 4:
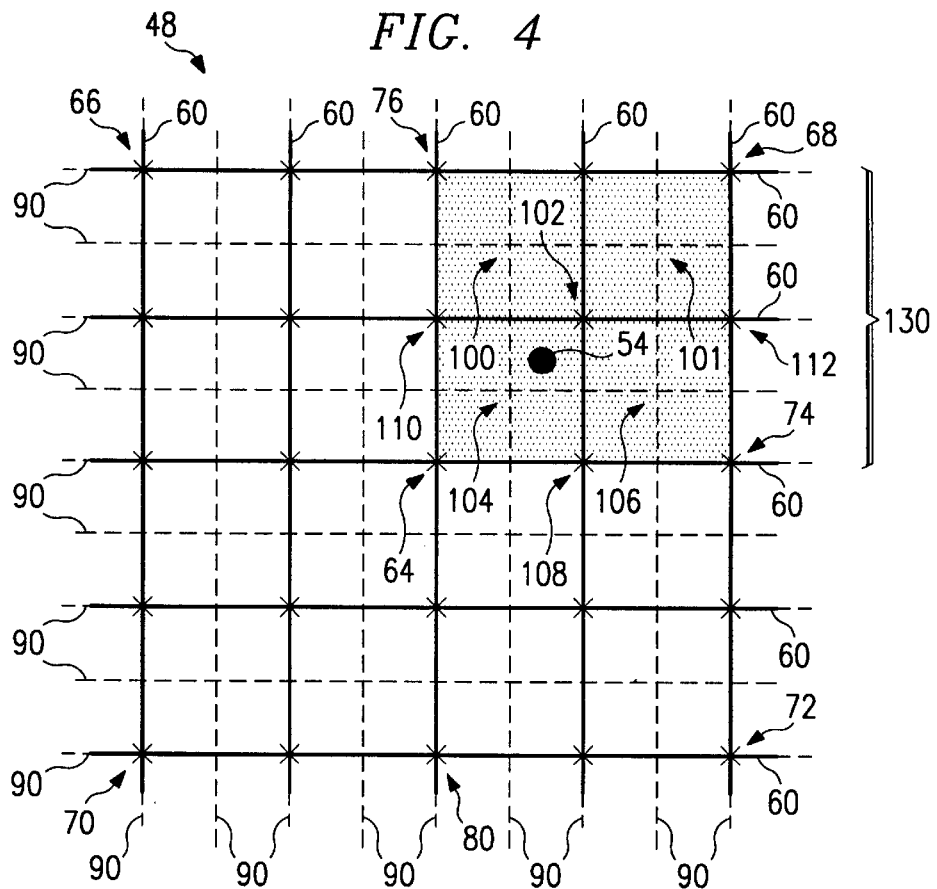
FIG. 4 illustrates first and second refined meshes over a first subdomain of a component.

FIG. 4 illustrates first refined mesh 60 in solid lines and second refined mesh 90 in dashed lines over subdomain 48 of the component. Subdomain 48 includes source 54 and is defined by common nodes 66, 68, 70, and 72 as discussed above. Although subdomain 48 includes source 54, the following discussion applies equally to subdomains that include sources 52 and 56. Second refined mesh 90 defines multiple areas, volumes, or other regions, in two or three dimensions, within subdomain 48. In one embodiment, second refined mesh 90 defines regions having the same shape as the regions defined by first refined mesh 60, but having one fourth the area or one sixteenth the volume. That is, the intersecting solid lines or planes that form first refined mesh 60 are twice as far apart as the intersecting dashed lines or planes that form second refined mesh 90. The present invention contemplates any other suitable relationships between first refined mesh 60 and second refined mesh 90, depending on boundary conditions 6, subdomain 48, the desired accuracy of system 2, available computational resources, and other appropriate factors.

In one embodiment, as shown in FIG. 4, alternate lines or planes that form second refined mesh 90 overlap or coincide with the lines or planes that form first refined mesh 60 over the entire subdomain 48. As a result, each node of first refined mesh 60 is a node common to second refined mesh 90, as indicated by an "X" in FIG. 4. As described above in connection with coarse mesh 58 and first refined mesh 60, system 2 uses numeric relationships and boundary conditions 6 to integrate or otherwise determine a value for a characteristic of the component's behavior, for example, temperature, over a subdomain that surrounds each node of second refined mesh 90, in two or three dimensions, to predict the component's behavior at the particular node. The prediction associated with each node of second refined mesh 90 may vary over time.

Local boundary conditions 6 used to generate predictions for nodes of second refined mesh within subdomain 48 are defined for subdomain 48, in two or three dimensions, according to predictions generated for nodes of coarse mesh 58 or first refined mesh 60 that lie on the perimeter of subdomain 48. Local boundary conditions 6 for subdomain 48 may include some global boundary conditions 6 used to generate predictions for coarse mesh 58 and first refined mesh 60 over domain 50. For example, values generated using coarse mesh 58 for common nodes that define the boundary of subdomain 48, such as nodes 66, 76, 68, 74, 72, 80, 70, and 71 may be local boundary conditions 6 for calculations for regions within subdomain 48. Global boundary conditions 6 concerning the inherent thermal or other characteristics of the material from which the component is constructed may remain unchanged. In one embodiment, using local boundary conditions 6 to generate predictions for the next subdomain and the next refined mesh contribute to the accuracy of the predictions for the next refined mesh and the minimization of computational burdens.

For example, for a two dimensional subdomain 48 using second refined mesh 90, system 2 integrates one or more partial differential equations in accordance with boundary conditions 6 over the subdomain defined by nodes 100, 101, 104, and 106 to generate a temperature prediction for node 102, possibly using predicted values for nodes 100, 101, 104, and 106 in the calculation; integrates according to boundary conditions 6 over the subdomain defined by nodes 110, 102, 64, and 108 to generate a temperature prediction for node 104, possibly using predicted values for nodes 110, 102, 64, and 108 in the calculation; and integrates according to boundary conditions 6 over the subdomain defined by nodes 102, 112, 108, and 74 to generate a temperature prediction for node 106, possibly using predicted values for nodes 102, 112, 108, and 74 in the calculation. The present invention contemplates any suitable technique to generate a prediction according to numeric relationships and boundary conditions 6 for the characteristic for each node of second refined mesh 90.

In one embodiment, as described above in connection with coarse mesh 58 and first refined mesh 60, for each common node of first refined mesh 60 and second refined mesh 90 shown as an "X", the prediction generated using second refined mesh 90 is more accurate than the prediction generated using first refined mesh 60. System 2 calculates the difference for each common node between the prediction generated using first refined mesh 60 and the prediction generated using second refined mesh 90. Since a difference between the predictions that is greater than the threshold represents a need for greater refinement, system 2 uses the difference to locate further subdomains within subdomain 48, if any, for which further refinement in space is desirable.

If the difference in predictions for a common node, for example, node 64, is within a predetermined threshold, system 2 deems the prediction generated using first refined mesh 60 adequate and performs no further spatial refinement for at least a portion of the subdomain that was used to generate the prediction. If the difference for a common node, for example, node 102, exceeds the threshold, system 2 generates a third refined mesh over an associated subdomain 130. Subdomain 130, like subdomain 48, may be defined by a rectangle or rectangular volume that includes all common nodes having a difference that exceeds the threshold. In this manner, system 2 nests subdomains that define regions of increasing spatial granularity.

Figure 5:
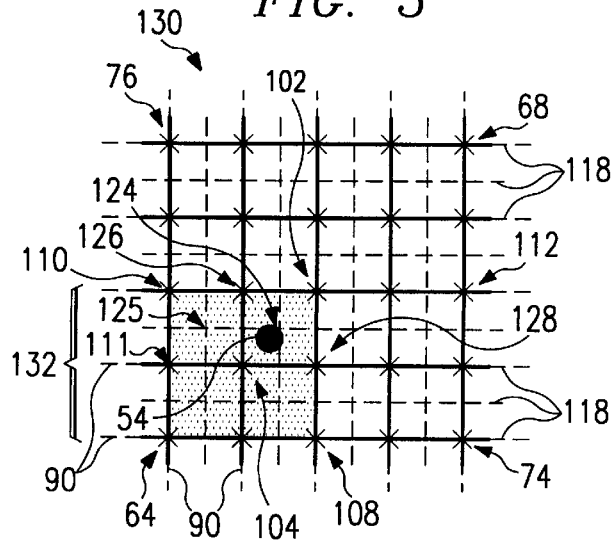
FIG. 5 illustrates second and third refined meshes over a second subdomain of a component.

FIG. 5 illustrates second refined mesh 90 in solid lines and third refined mesh 118 in dashed lines over subdomain 130 of the component. Subdomain 130 includes source 54 and is defined by common nodes 76, 68, 64, and 74. Although subdomain 130 includes source 54, the following discussion applies equally to subdomains that include sources 52 and 56. Third refined mesh 118 defines multiple areas, volumes, or other regions, in two or three dimensions, within subdomain 130. In one embodiment, third refined mesh 118 defines regions having the same shape as the regions defined by second refined mesh 90, but having one fourth the area or one sixteenth the volume. That is, the intersecting solid lines or planes that form second refined mesh 90 are twice as far apart as the intersecting dashed lines or planes that form third refined mesh 118. The present invention contemplates any other suitable relationships between second refined mesh 90 and third refined mesh 118, depending on boundary conditions 6, subdomain 130, the desired accuracy of system 2, available computational resources, and other factors.

In one embodiment, as shown in FIG. 5, alternate lines or planes that form third refined mesh 118 overlap or coincide with the lines or planes that form second refined mesh 90. As a result, each node of second refined mesh 118 is a node common to third refined mesh 90, as indicated by an "X" in FIG. 5. As described above in connection with first refined mesh 60 and second refined mesh 90, system 2 uses numeric relationships and boundary conditions 6 to integrate or determine a value for a characteristic of the component's behavior, for example, temperature, over a subdomain surrounding each node of third refined mesh 118, in two or three dimensions, to generate a prediction of the component's behavior for the particular node. The prediction for each node of third refined mesh 118 may vary as a function of time.

In a similar manner to that discussed above for second refined mesh 90, boundary conditions 6 used to generate predictions for the nodes of third refined mesh within subdomain 130 are determined for subdomain 130, in two or three dimensions, according to predictions generated for nodes of first refined mesh 60 or second refined mesh 90 that lie on the perimeter of subdomain 130, as local boundary conditions 6. Boundary conditions 6 may also be global boundary conditions 6 defined for domain 50 or subdomain 48.

For example, for a two dimensional subdomain 130 using third refined mesh 118, system 2 integrates one or more partial differential equations in accordance with boundary conditions 6 over the subdomain defined by nodes 126, 102, 104, and 128 to generate a temperature prediction for node 124, possibly using predicted values for nodes 126, 102, 104, and 128 in the calculation; and integrates according to boundary conditions 6 over the subdomain defined by nodes 110, 126, 111, and 104 to generate a temperature prediction for node 125, possibly using predicted values for nodes 110, 126, 111, and 104 in the calculation. Other suitable techniques may be used to generate a prediction according to numeric relationships and boundary conditions 6 for each node of third refined mesh 118.

In the manner discussed above, system 2 calculates the difference for each common node shown as an "X" between the prediction generated using second refined mesh 90 and the prediction generated using third refined mesh 118 to locate further subdomains within subdomain 130, if any, for which further spatial refinement is desirable. If a comparison of the difference to a predetermined threshold indicates that further spatial refinement is desirable over one or more subdomains 132 within subdomain 130, system 2 generates a fourth refined mesh over subdomain 132 to once again nest according to increasing spatial granularity. Like subdomains 48 and 130, subdomain 132 may be defined by a rectangle or rectangular volume that includes all common nodes having a difference exceeding the threshold.

Figure 6:
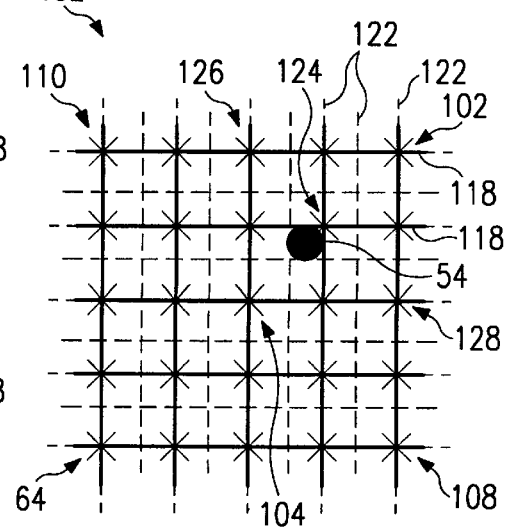
FIG. 6 illustrates third and fourth refined meshes over a third subdomain of a component.

FIG. 6 illustrates third refined mesh 118 in solid lines and fourth refined mesh 122 in dashed lines over subdomain 132 of the component. Subdomain 132 includes source 54 and is defined by common nodes 110, 102, 64, and 108. As FIGS. 3 through 6 illustrate, system 2 spatially refines selected portions of domain 50 in the manner discussed above to predict the component's behavior with respect to the characteristic to a desired accuracy, while minimizing the expenditure of computational resources.

Figure 7:
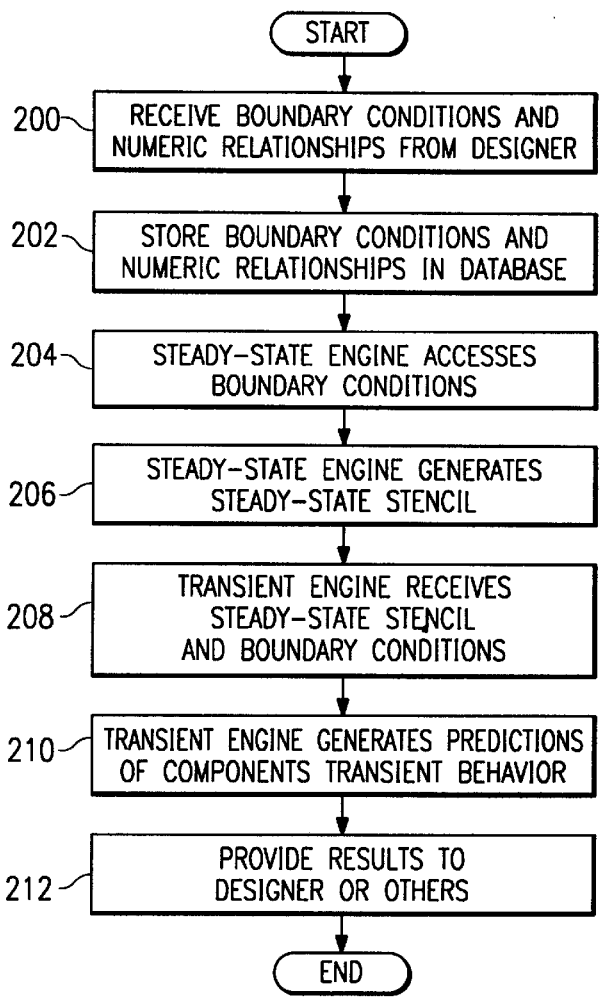
FIG. 7 illustrates an exemplary method of predicting the behavior of a component according to the present invention.

FIG. 7 illustrates a method for predicting the transient behavior of a component. The method begins at step 200, where system 2 receives boundary conditions 6 from designer 4 using link 10 and interface 8. At step 202, system 2 stores boundary conditions 6 in database 12. System 2 may also receive and store numeric relationships at step 202 and 204, respectively, that govern the thermal or other behavior of the component, for example, suitable partial differential equations. Steady-state engine 14 accesses boundary conditions 6 at step 204 and, at step 206, solves the governing equations to generate steady-state stencil 16 in accordance with boundary conditions 6. Transient engine 18 receives steady-state stencil 16, boundary conditions 6, and other information at step 208 and, at step 210, solves the governing equations to generate prediction 20 of the component's transient behavior with respect to the characteristic to a desired accuracy. System 2 may communicate, convey, or otherwise provide prediction 20 to designer 4 or other persons or devices associated with system 2 at step 212, and the method ends.

Figure 8:
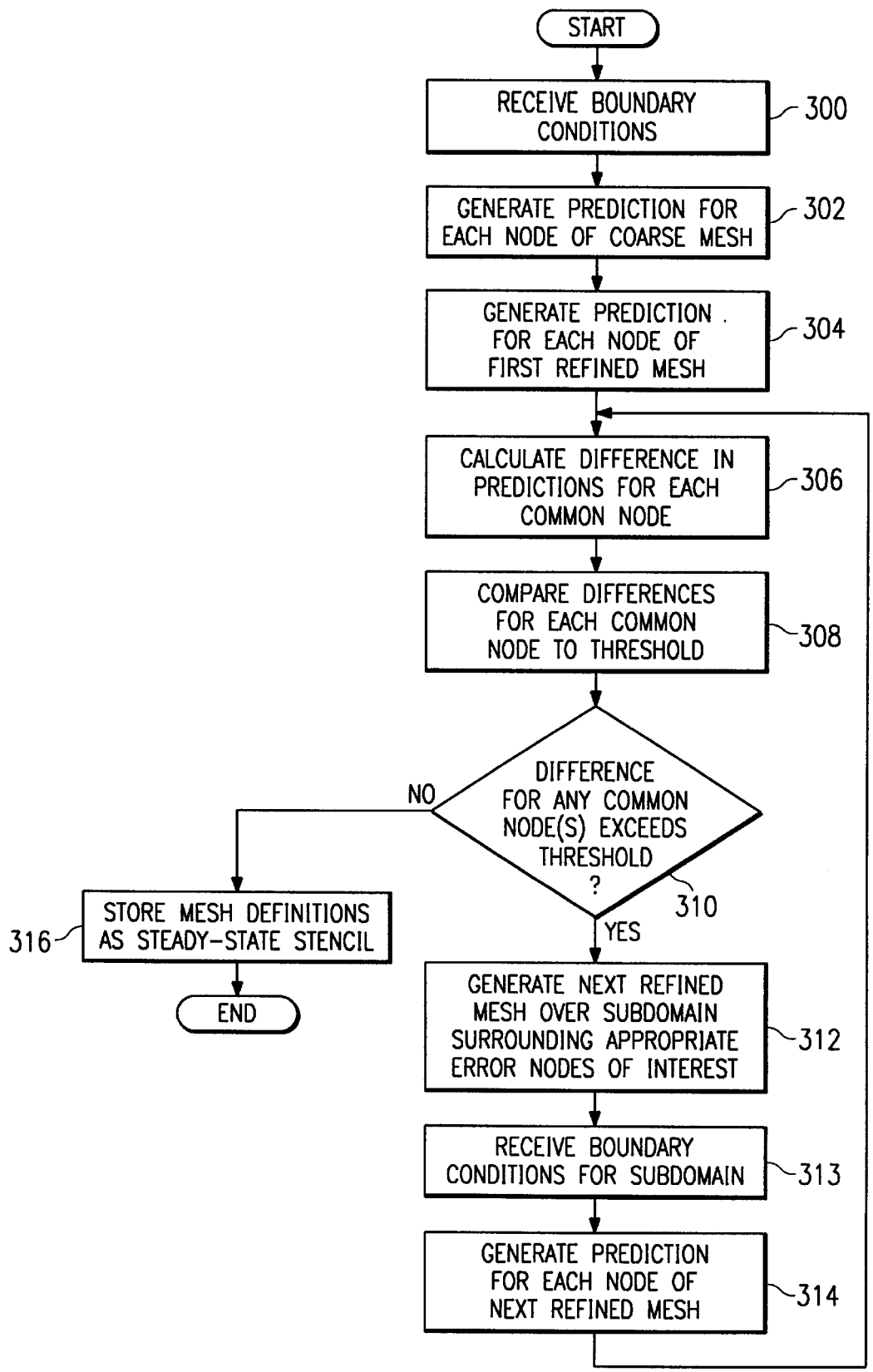
FIG. 8 illustrates an exemplary method of generating a steady-state stencil.

FIG. 8 illustrates a method for generating steady-state stencil 16. The method begins at step 300, where steady-state engine 14 receives boundary conditions 6. At step 302, steady-state engine 14 solves, for example, associated heat transfer equations to generate temperature predictions for each node of coarse mesh 58. In a similar manner, steady-state engine 14 generates a prediction at step 304 for the characteristic for each node of first refined mesh 60. At step 306, steady-state engine 14 calculates the difference between the prediction generated using coarse mesh 58 and the prediction generated using first refined mesh 60 for each common node.

At step 308, steady-state engine 14 compares the difference in predictions for each common node to a predetermined threshold. If the difference for any common node exceeds the threshold at step 310, indicating a need to further refine the prediction, steady-state engine 14 identifies the common node as an error node. Steady-state engine 14 then generates second refined mesh 90 at step 312 to encompass error nodes of interest, which may include all error nodes, all error nodes not excluded from further consideration as a result of an interest definition set forth in boundary conditions 6, or other suitable error nodes. In a particular embodiment, second refined mesh 90 is defined by a rectangle or rectangular volume including all error nodes, which may be increased in dimension to incorporate a buffer between its boundaries and the error nodes of interest.

At step 313, steady-state engine 14 receives predictions generated for nodes of coarse mesh 58 or first refined mesh 60 that lie on the perimeter of subdomain 48 as local boundary conditions. These previously calculated values, together with global boundary conditions 6 such as the spatial and temporal characteristics of a heat source 54 that lies within subdomain 48, allow steady-state engine 14 to localize the computation to subdomain 48 to increase resolution and minimize computational burdens. At step 314, steady-state engine 14 generates a prediction for each node of second refined mesh 90 in a similar manner as described above in connection with first refined mesh 60 and step 304.

The method then returns to step 306, where steady-state engine 14 calculates the difference for each common node between first refined mesh 60 and second refined mesh 90.

The method repeats steps 306 through 316 for each successively refined mesh over corresponding successively smaller regions within the component until no difference for any common node exceeds the predetermined threshold at step 310. In a particular embodiment, steady-state engine 14 nests successive meshes, each succeeding mesh of higher spatial granularity, around sources 52, 54, and 56 within the component or other areas of the component that experience high temperature flux. Successive meshes and associated subdomains need not share common boundaries. When no error nodes or a minimum number of error nodes are identified at step 310, steady-state engine 14 stores the mesh definitions as steady-state stencil 16 at step 316. The mesh definitions for coarse mesh 58 and each refined mesh may include a specification of mesh geometry in two or three dimensions and the size and character of mesh elements.

Figure 9:
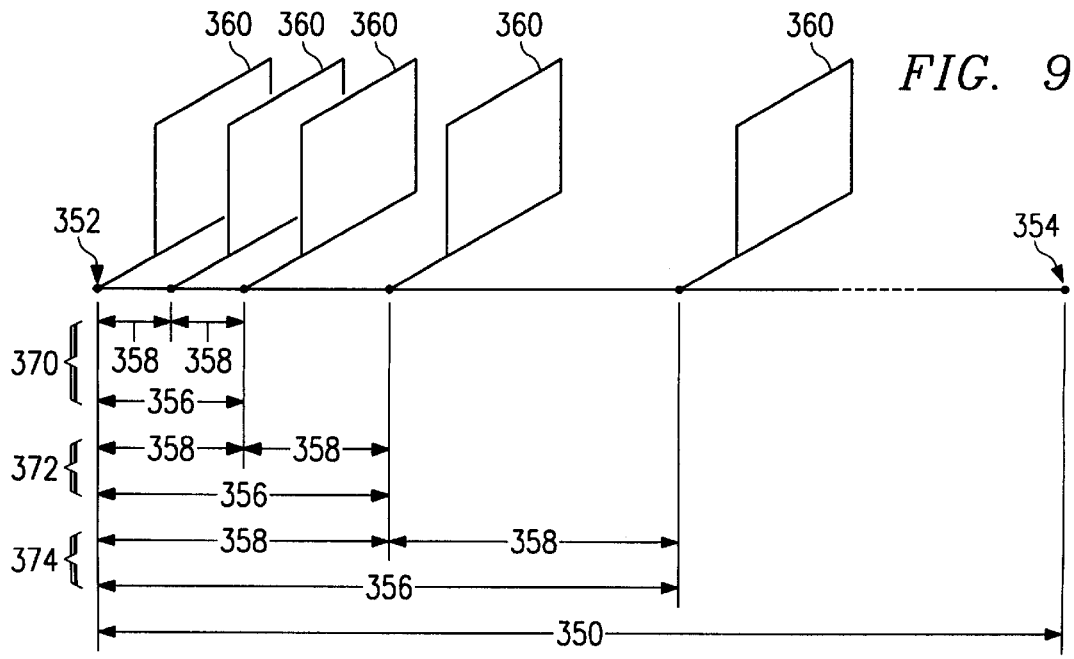
FIG. 9 illustrates time intervals and subintervals within a time period.

FIG. 9 illustrates various time intervals 356 and subintervals 358 within a time period 350 of prediction by transient engine 18. Period 350 begins at start time 352 and ends at end time 354. Transient engine 18 predicts the transient behavior of the component with respect to a characteristic, for example, temperature, over period 350. Period 350 includes time intervals 356 and subintervals 358 of various durations. Interval group 370 includes the shortest interval 356 and subintervals 358, whereas interval group 374 includes the longest interval 356 and subintervals 358 illustrated in FIG. 9. For each interval 356, transient engine 18 balances the competing considerations of accuracy and computational economy to determine the desirability of increased or decreased temporal refinement. The magnitude of the particular interval 356 is specified according to this determination. Mesh 360 may be coarse mesh 58 or any of the refined meshes discussed above.

Figure 10A:
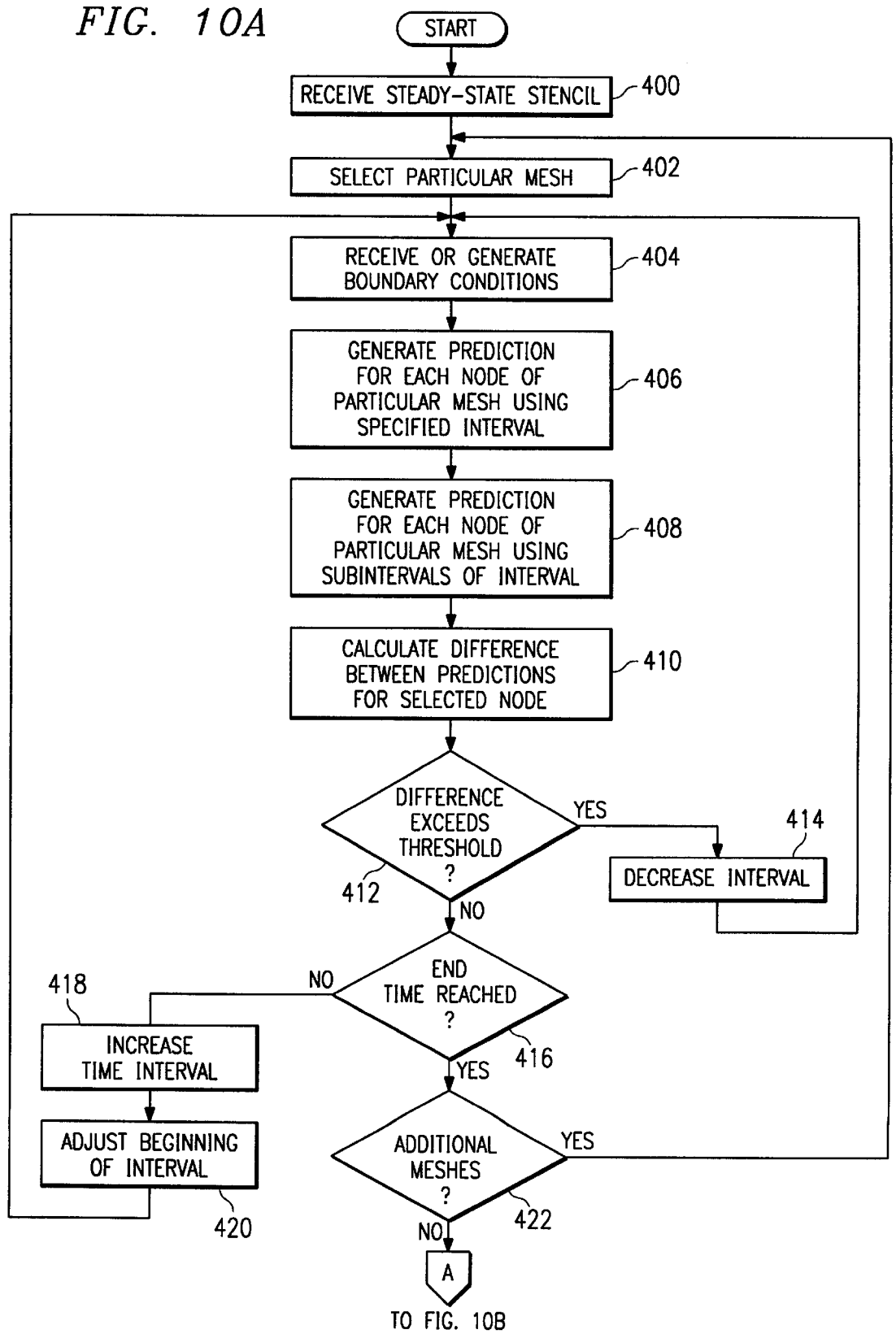
FIGS. 10A and 10B illustrate an exemplary method of generating a prediction of the transient behavior of a component.
Figure 10B:
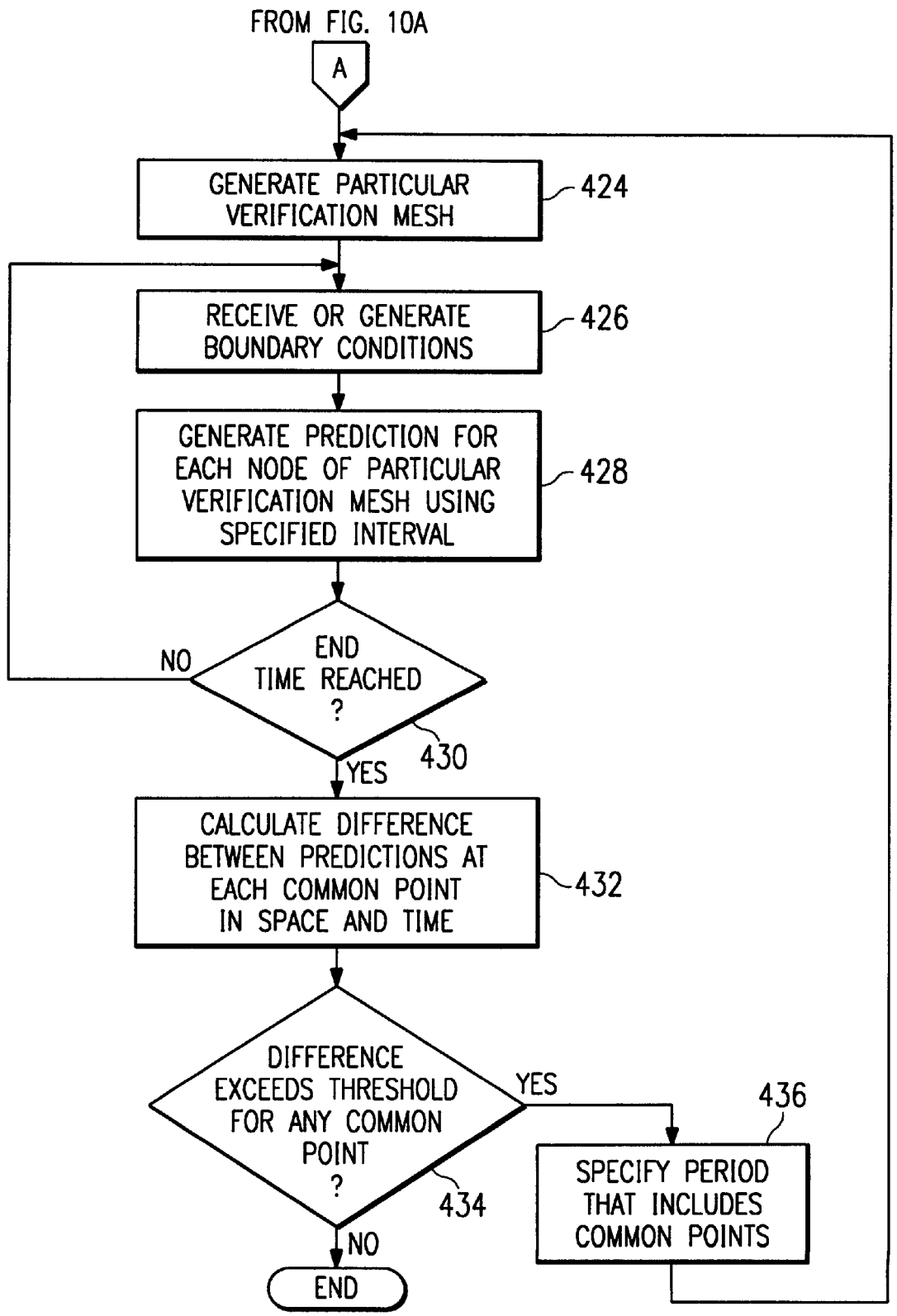

FIG. 10 illustrates a method for generating a prediction of the component's transient behavior with respect to a characteristic over specified time period 350. The method begins at step 400, where transient engine 18 receives steady-state stencil 16. As previously discussed, steady-state stencil 16 includes a geometric pattern of successively refined meshes over successively smaller regions, in two or three dimensions, within the component. In one embodiment, steady-state stencil 16 also includes a prediction of the component's behavior for each node of each mesh at a start time 352 that begins period 350. At step 402, transient engine 18 selects a particular mesh, for example, coarse mesh 58, from among the successively refined meshes that form steady-state stencil 16.

At step 404, transient engine 18 receives or generates boundary conditions 6. Transient engine 18 may receive local boundary conditions 6 for one, some, or all of the meshes in steady-state stencil 16, together with or separately from steady-state stencil 16; may generate local boundary conditions 6 for each successive mesh each time the method proceeds through step 404 in the manner discussed above; may receive global boundary conditions 6 for the defined problem; or may receive or generate one or more boundary conditions 6 suitable for the particular mesh in any other appropriate manner.

In one embodiment, if the time for which transient engine 18 is generating predictions has not been visited in connection with a previous mesh, transient engine 18 generates boundary conditions 6 for the particular mesh according to an interpolation from boundary conditions 6 for the last refined mesh or other previous mesh for times earlier and later in period 350. For example, transient engine 18 might generate boundary conditions 6 for the particular mesh using boundary conditions 6 for the last refined mesh for an earlier time during period 350 that ends an interval 356 used for the last refined mesh, and boundary conditions 6 for the last refined mesh for a later time during period 350 that begins the interval 356 for the last refined mesh. The interpolation performed to generate boundary conditions 6 for the particular mesh may be a linear or non-linear interpolation over some or all of an interval 356 used for the last refined mesh or other previous mesh.

At step 406, transient engine 18 uses steady-state stencil 16 and boundary conditions 6 to generate a prediction for each node of the particular mesh at a later time, for example, a time specified by interval 356 from start time 352. In one embodiment, interval 356 initially selected for the particular mesh depends on the spatial refinement of the particular mesh, such that interval 356 may successively decrease as transient engine 18 processes successively refined meshes. For example, the initial interval 356 for coarse mesh 58 may be a one second interval, while the initial interval 356 for first refined mesh 60 may be a one-tenth second interval.

At step 408, transient engine 18 uses steady-state stencil 16 and boundary conditions 6 to generate a prediction for each node of the mesh at the time specified by interval 356 using two or more subintervals 358 of interval 356. For example, transient engine 18 may generate a prediction at one second using two one-half second subintervals, four one-fourth second subintervals, or other appropriate subintervals of the one second interval. Transient engine 18 may overwrite or otherwise replace predictions for nodes generated using one or more previous meshes.

Transient engine 18 generates predictions for each node of the particular mesh at steps 406 and 408. Alternatively, transient engine 18 generates predictions for selected nodes. Selected nodes may be outside the next successive subdomain, for example, subdomain 48, but near enough to the subdomain to indicate the influence of a source 52, 54, or 56 within the subdomain to a desired accuracy.

Due to the partial differential equations used to generate temperature predictions, the predictions generated at step 408 using subintervals 358 are more accurate than the predictions generated at step 406 using interval 356. At step 410, transient engine 18 calculates the difference between the predictions generated at steps 406 and 408 for one or more selected nodes, for example, a node close to the next successive subdomain. Using the difference calculated at step 410, transient engine 18 determines whether interval 356 is short enough to resolve the component's transient behavior at each node of the particular mesh to a desired accuracy throughout interval 356.

If the difference between the predictions exceeds a predetermined threshold at step 412, transient engine 18 decreases interval 356 at step 414. The next interval 356 may be a subinterval 358 of the previous interval 356, for example, a one-half second interval, one-tenth second interval, or other suitable subinterval 358. For example, referring to FIG. 9, transient engine 18 may begin with interval group 374 and then select interval group 372 if the difference exceeds the threshold. If the method later repeats step 412 and the difference still exceeds the threshold, transient engine 18 selects interval group 370. In a particular embodiment, transient engine 18 may decrease interval 356 to a minimum interval length, and continue using the minimum interval length even though the difference exceeds the threshold. Steps 404 through 414 are repeated as many times as necessary, for successively decreased intervals 356, until the difference calculated at step 410 does not exceed the predetermined threshold at step 412.

If the difference does not exceed the threshold at step 412, and end time 354 has not been reached at step 416, transient engine 18 may increase interval 356 at step 418. For example, if the previous interval 356 is a one-half second interval from the beginning of period 350, the next interval 356 might be a one second interval from the end of the previous one-half second interval 356. Referring again to FIG. 9, transient engine 18 may begin with interval group 370 and then select interval group 372 if the difference falls below the threshold.

The next interval 356 may be the same as the previous interval 356, longer than the previous interval 356, a multiple of the previous interval 356, or any other suitable interval 356. In a particular embodiment, transient engine 18 may increase interval 356 to a maximum interval length, and continue using the maximum interval length as long as the difference falls below the threshold. Regardless of the length to which interval 356 is increased, transient engine 18 adjusts the beginning of the next interval 356 at step 420 to begin at the end of the previous interval 356. The method returns to step 404 where transient engine 18 receives or generates numeric relationships and boundary conditions 6 for the next interval 356 for the particular mesh.

Steps 404 through 420 are repeated as many times as necessary, for identical or successively longer intervals 356, until the difference between predictions calculated at step 410 exceeds the predetermined threshold at step 412, in which case transient engine 18 decreases interval 356 at step 414. If end time 354 has been reached at step 416, transient engine 18 has predicted the component's transient behavior for the particular mesh for the entire period 350 and the method proceeds to step 422. If steady-state stencil 16 includes one or more additional meshes at step 422, then the method returns to step 402, where transient engine 18 selects the next particular mesh.

As discussed above, transient engine 18 receives or generates boundary conditions 6 for the next mesh in accordance with: local boundary conditions 6 for one or more previous meshes; predictions generated for one or more nodes of one or more previous meshes that define the boundary of a particular mesh or subdomain within steady-state stencil 16; global boundary conditions 6; or other factors. In one embodiment, the nodes that define the boundary of the subdomain corresponding to the next mesh have associated previous predictions that transient engine 18 uses as local boundary conditions 6 to generate predictions for nodes of the next mesh. If steady-state stencil 16 does not include additional meshes at step 422, the prediction of the component's transient behavior for period 350 is complete. In one embodiment, transient engine 18 verifies the accuracy of this prediction using further spatial and temporal refinement.

Transient engine 18 generates a verification mesh at step 424 over a selected subdomain within the component at step 424, in two or three dimensions. In one embodiment, the subdomain for the verification mesh is the subdomain corresponding to the last refined mesh selected at step 402, for example, subdomain 132 corresponding to fourth refined mesh 122. The verification mesh may be more spatially refined than the last refined mesh, such that adjacent nodes of the verification mesh are closer to one another, for example, twice as close, than adjacent nodes of the last refined mesh. At step 426, transient engine 18 receives or generates boundary conditions 6 for a specified time interval 356 that is shorter than interval 356 used to generate predictions for the last refined mesh at step 406. For example, if interval 356 for the last refined mesh was a one microsecond interval, the specified interval 356 for the verification mesh might be a ten nanosecond interval or other suitable interval 356. Transient engine 18 may specify one or more periods 350 for the verification mesh that are shorter than period 350 for the refined meshes discussed above.

Boundary conditions 6 received or generated at step 426 may include boundary conditions 6 from one or more previous meshes. In one embodiment, boundary conditions 6 for the specified interval 356 are generated according to an interpolation from boundary conditions 6 for the last refined mesh for times earlier and later in period 350 than the ending of the next interval 356. For example, transient engine 18 might generate boundary conditions 6 for the verification mesh for interval 356 using boundary conditions 6 for the last refined mesh for a first time during period 350 that is earlier than the ending of the next interval 356, and boundary conditions 6 for the last refined mesh for a second time during period 350 that is later than the ending of the next interval 356. The interpolation performed to generate boundary conditions 6 for the verification mesh may be a linear or non-linear interpolation over some or all of the specified interval 356 for the verification mesh.

In accordance with boundary conditions 6, transient engine 18 generates a prediction for each node of the verification mesh at step 428 at interval 356. At step 430, if end time 354 has not been reached, the method returns to step 426, where transient engine 18 receives or generates numeric relationships and boundary conditions 6 for the next interval 356. The next interval 356 may be a fixed time interval. Steps 426 through 430 may be repeated as many times as necessary until end time 354 has been reached at step 430. At this point, transient engine 18 has generated a complete prediction of the component's transient behavior over period 350 using the verification mesh.

Transient engine 18 calculates the difference between the predictions generated using the last refined mesh and the predictions generated using the verification mesh at step 432 for each common point in time and space. If the difference for one or more common points exceeds a predetermined threshold at step 434, transient engine 18 specifies one or more time periods that include these common points at step 436. The method then returns to step 424, where transient engine 18 generates a verification mesh that is more spatially refined than the previous verification mesh, such that adjacent nodes of the new verification mesh are closer to one another, for example, twice as close, than adjacent nodes of the previous verification mesh.

Transient engine 18 may generate the new verification mesh over the same subdomain within the component as for the previous verification mesh or for a smaller subdomain. In one embodiment, transient engine 18 generates boundary conditions 6 at step 426 and generates predictions for each node at step 428 only for selected time intervals 356 within the period specified at step 436. These intervals 356 for the new verification mesh may be shorter than intervals 356 for the previous verification mesh. The method continues to repeat steps 424 through 436 in this manner, using successive spatial and temporal refinements, until the difference between predictions for each common point in space and time falls below the predetermined threshold at step 434. Prediction 20 of the component's transient behavior to a desired accuracy over the entire period 350 is then complete, and the method ends.

Although the present invention has been described with several embodiments, a plethora of changes, substitutions, variations, alterations, transformations and modifications may be suggested to one skilled in the art, and it is intended that the present invention encompass such changes, substitutions, variations, alterations, transformations, and modifications as fall within the spirit and scope of the appended claims.

What is claimed is:

1. A system operable on one or more computers for predicting the behavior of a component, the system comprising:

a steady-state engine operable to receive one or more boundary conditions and to generate a plurality of first values representing the behavior of the component at a plurality of first nodes defined by a coarse mesh, the steady-state engine operable to generate a plurality of second values representing the behavior of the component at a plurality of second nodes defined by a first refined mesh, the coarse mesh coinciding with the first refined mesh at a plurality of common nodes, the steady-state engine operable to define a first subdomain in response to a comparison of the first values and the second values for the common nodes, the first subdomain used to predict the behavior of the component.

2. The system of claim 1, wherein the system predicts the thermal behavior of the component, the steady-state engine operable to solve partial differential equations to generate the first values and the second values representing thermal predictions for corresponding nodes.

3. The system of claim 1, wherein the system predicts the fluid dynamic behavior of the component, the steady-state engine operable to solve partial differential equations to generate the first values and the second values representing velocity predictions for corresponding nodes.

4. The system of claim 1, wherein the steady-state engine is operable to generate a difference between a first value and a second value of a common node, the steady-state engine further operable to specify the common node as an error node if the difference exceeds a threshold.

5. The system of claim 1, wherein the steady-state engine is further operable to generate a plurality of third values representing the behavior of the component at a plurality of third nodes defined by a second refined mesh, the first refined mesh coinciding with the second refined mesh at a plurality of common nodes, the steady-state engine operable to define a second subdomain within the first subdomain in response to a comparison of the second and third values for the common nodes.

6. The system of claim 5, wherein the steady-state engine is operable to generate a difference between a second value and a third value of a common node, the steady-state engine further operable to specify the common node as an error node if the difference exceeds a threshold.

7. The system of claim 1, further comprising a transient engine operable to generate a first prediction for a node of the coarse mesh at a first time that ends a time interval, the transient engine operable to generate an intervening prediction for the node at a second time within the time interval, the transient engine operable to generate a second prediction for the node at the first time using the intervening prediction, the transient engine operable to adjust the time interval in response to a comparison of the first prediction and the second prediction.

8. The system of claim 7, wherein the transient engine is operable to decrease the time interval if the difference between the first prediction and the second prediction exceeds a threshold.

9. The system of claim 7, wherein the transient engine is operable to increase the time interval if the difference between the first prediction and the second prediction falls below a threshold.

10. A method operable on one or more computers for predicting the behavior of a component, the method comprising:

receiving one or more boundary conditions;

generating a plurality of first values representing the behavior of the component at a plurality of first nodes defined by a coarse mesh;

generating a plurality of second values representing the behavior of the component at a plurality of second nodes defined by a first refined mesh, the coarse mesh coinciding with the first refined mesh at a plurality of first common nodes;

comparing the first values and the second values for the first common nodes; and defining a first subdomain according to the comparison of the first values and the second values, the first subdomain used to predict the behavior of the component.

11. The method of claim 10, wherein:

the component includes a source that influences the temperature within at least a portion of the component; and the first and second values comprise temperature predictions.

12. The method of claim 10, wherein:

the component includes a source that influences the fluid velocity within at least a portion of the component; and the first and second values comprise fluid velocity predictions.

13. The method of claim 10, wherein:

the first values lying outside the first subdomain predict the behavior of the component to a desired accuracy outside the first subdomain; and the second values lying within the first subdomain predict the behavior of the component to a desired accuracy within the first subdomain.

14. The method of claim 10, wherein:

the first values and the second values represent thermal predictions for corresponding nodes; and the steps for generating the first values and the second values comprise solving partial differential equations to generate thermal predictions.

15. The method of claim 10, wherein:

the first values and the second values represent fluid velocity predictions for corresponding nodes; and the steps for generating the first values and the second values comprise solving partial differential equations to generate fluid velocity predictions.

16. The method of claim 10, wherein the step of comparing the first values and the second values comprises comparing the difference between the first values and the second values for a first common node to a threshold.

17. The method of claim 10, further comprising the steps of:

generating a plurality of third values representing the behavior of the component at a plurality of third nodes defined by a second refined mesh, the first refined mesh coinciding with the second refined mesh at a plurality of second common nodes;

comparing the second values and the third values for the second common nodes; and defining a second subdomain according to the comparison of the second values and the third values.

18. The method of claim 17, wherein:

the second values lying outside the second subdomain predict the behavior of the component to a desired accuracy outside the second subdomain; and the third values lying within the second subdomain predict the behavior of the component to a desired accuracy within the second subdomain.

19. The method of claim 10, further comprising the steps of:

generating a first prediction for a node of the coarse mesh at a first time that ends a time interval;

generating an intervening prediction for the node at a second time within the time interval;

generating a second prediction for the node at the first time using the intervening prediction;

comparing the first prediction and the second prediction; and adjusting the time interval according to the comparison of the first prediction and the second prediction.

20. The method of claim 19, wherein adjusting the time interval comprises decreasing the time interval if the difference between the first prediction and the second prediction exceeds a threshold.

21. The method of claim 19, wherein adjusting the time interval comprises increasing the time interval if the difference between the first prediction and the second prediction falls below a threshold.

22. A method operable on one or more computers for predicting the thermal behavior of a component, the method comprising:

receiving one or more boundary conditions;

generating a plurality of first temperature predictions at a plurality of first nodes defined by a coarse mesh;

generating a plurality of second temperature predictions at a plurality of second nodes defined by a first refined mesh, the coarse mesh coinciding with the first refined mesh at a plurality of common nodes;

generating a plurality of differences between the first temperature predictions and the second temperature predictions for the common nodes;

comparing the differences to a first threshold to define error nodes; and defining a first subdomain that includes the error nodes, the first subdomain used to predict the thermal behavior of the component.

23. The method of claim 22, further comprising the step of replacing the first temperature predictions with the second temperature predictions for common nodes within the first subdomain.

24. The method of claim 22, wherein the steps for generating the first temperature predictions and the second temperature predictions comprise solving partial differential equations that govern the thermal behavior of the component.

25. The method of claim 22, further comprising:

generating a third temperature prediction for a node of the coarse mesh at a second time that ends a time interval;

generating an intervening temperature prediction for the node at the second time within the time interval;

generating a fourth temperature prediction for the node at the first time using the intervening temperature prediction;

comparing the third temperature prediction and the fourth temperature prediction;

adjusting the time interval according to the comparison of the third temperature prediction and the fourth temperature prediction; and generating a fifth temperature prediction for the node at a second time that ends the adjusted time interval.

26. The method of claim 25, wherein adjusting the time interval comprises decreasing the time interval if the difference between the third temperature prediction and the fourth temperature prediction exceeds a second threshold.

27. The method of claim 25, wherein adjusting the time interval comprises increasing the time interval if the difference between the third temperature prediction and the fourth temperature prediction falls below a second threshold.

28. A method operable on one or more computers for predicting the fluid dynamic behavior of a component, the method comprising:

receiving one or more boundary conditions;

generating a plurality of first velocity predictions at a plurality of first nodes defined by a coarse mesh;

generating a plurality of second velocity predictions at a plurality of second nodes defined by a first refined mesh, the coarse mesh coinciding with the first refined mesh at a plurality of common nodes;

generating a plurality of differences between the first velocity predictions and the second velocity predictions for the common nodes;

comparing the differences to a first threshold to define error nodes; and defining a first subdomain that includes the error nodes, the first subdomain used to predict the fluid dynamic behavior of the component.

29. The method of claim 28, further comprising the step of replacing the first velocity predictions with the second velocity predictions for common nodes within the first subdomain.

30. The method of claim 28, wherein the steps for generating the first velocity predictions and the second velocity predictions comprise solving partial differential equations that govern the fluid dynamic behavior of the component.

31. The method of claim 28, further comprising:

generating a third velocity prediction for a node of the coarse mesh at a second time that ends a time interval;

generating an intervening velocity prediction for the node at the second time within the time interval;

generating a fourth velocity prediction for the node at the first time using the intervening velocity prediction;

comparing the third velocity prediction and the fourth velocity prediction;

adjusting the time interval according to the comparison of the third velocity prediction and the fourth velocity prediction; and generating a fifth velocity prediction for the node at a second time that ends the adjusted time interval.

32. The method of claim 31, wherein adjusting the time interval comprises decreasing the time interval if the difference between the third velocity prediction and the fourth velocity prediction exceeds a second threshold.

33. The method of claim 31, wherein adjusting the time interval comprises increasing the time interval if the difference between the third velocity prediction and the fourth velocity prediction falls below a second threshold.

* * * * *